(12) United States Patent　　(10) Patent No.: US 11,740,665 B1
Summerville et al.　　(45) Date of Patent: Aug. 29, 2023

(54) FOLDABLE COMPUTER TO SENSE CONTACT OF TOUCH-ENABLED SURFACE WITH OTHER PORTION OF COMPUTER WHILE COMPUTER IS CLOSED

(71) Applicant: Lenovo (United States) Inc., Morrisville, NC (US)

(72) Inventors: Mark K. Summerville, Apex, NC (US); Sandy Collins, Durham, NC (US); Mark Christopher Heidenfeldt, Morrisville, NC (US); Justin Ringuette, Morrisville, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/817,745

(22) Filed: Aug. 5, 2022

(51) Int. Cl.
　　*G06F 1/16*　　(2006.01)
　　*G06F 11/32*　　(2006.01)
　　*G06F 3/044*　　(2006.01)

(52) U.S. Cl.
　　CPC .......... *G06F 1/1677* (2013.01); *G06F 1/1616* (2013.01); *G06F 1/1643* (2013.01); *G06F 3/044* (2013.01); *G06F 11/32* (2013.01)

(58) Field of Classification Search
　　CPC .... G06F 1/1677; G06F 1/1616; G06F 1/1643; G06F 3/044; G06F 11/32
　　See application file for complete search history.

(56) References Cited

U.S. PATENT DOCUMENTS

2003/0008679 A1* 1/2003 Iwata ................. H04M 1/2747
　　　　　　　　　　　　　　　　　455/566
2014/0049463 A1* 2/2014 Seo ........................ G06F 3/01
　　　　　　　　　　　　　　　　　345/156

* cited by examiner

*Primary Examiner* — Yaron Cohen
(74) *Attorney, Agent, or Firm* — John M. Rogitz; John L. Rogitz (57) ABSTRACT

In one aspect, a laptop computer or other type of foldable computer may include a processor, a touch-enabled surface accessible to the processor, and storage accessible to the processor. The storage may include instructions executable by the processor to determine that, while the foldable computer is closed, a portion of the foldable computer has contacted the touch-enabled surface. Responsive to the determination, the instructions may be executable to execute at least one action at the foldable computer that is related to the portion contacting the touch-enabled surface while the foldable computer is closed.

19 Claims, 6 Drawing Sheets

FOLDABLE COMPUTER TO SENSE CONTACT OF TOUCH-ENABLED SURFACE WITH OTHER PORTION OF COMPUTER WHILE COMPUTER IS CLOSED

FIELD

The disclosure below relates to technically inventive, non-routine solutions that are necessarily rooted in computer technology and that produce concrete technical improvements. In particular, the disclosure below relates to foldable computers to sense contact of a touch-enabled surface with another portion of the computer while the computer is closed.

BACKGROUND

As recognized herein, a laptop computer might be stored in a backpack, briefcase, or other location where external pressure might be exerted on the computer from multiple sides. As also recognized herein, this can lead to damage over time, or even acute damage, to internal components of the computer. There are currently no adequate solutions to the foregoing computer-related, technological problem.

SUMMARY

Accordingly, in one aspect a foldable computer includes at least one processor, a touch-enabled surface accessible to the at least one processor, and storage accessible to the at least one processor. The storage includes instructions executable by the at least one processor to determine that, while the foldable computer is closed, a portion of the foldable computer has contacted the touch-enabled surface. The portion is different from the touch-enabled surface. Responsive to the determination, the instructions are executable to execute at least one action at the foldable computer.

In some example implementations, the touch-enabled surface may include a touch-enabled display such as a capacitive touch-enabled display and/or a resistive touch-enabled display. In specific examples where the touch-enabled display is a capacitive touch-enabled display, the portion may be configured with a capacitive element that can be sensed by the capacitive touch-enabled display. The capacitive element may include a capacitor and/or a capacitive coating.

Also in various example implementations, the portion may include a palm rest area on a housing of the foldable computer, a touch pad at which input is receivable to move a display cursor, and/or a key of a keyboard.

In example embodiments, the at least one action may include storing data in a log. The data may indicate that, while the foldable computer was closed, the portion of the foldable computer contacted the touch-enabled surface. In one specific example implementation, the storing of the data may be executed by the foldable computer's basic input/output system (BIOS). So, e.g., the foldable computer may include a system board and the log may be stored in a storage area on the system board that is accessible to the BIOS.

Additionally or alternatively, the at least one action may include presenting, at the foldable computer, an audible warning and/or a visual warning. The audible warning may include a beep, a tone, and/or a computerized voice indicating that the portion of the foldable computer contacted the touch-enabled surface while the foldable computer was closed. The visual warning may include a prompt on a display that indicates that the portion of the foldable computer contacted the touch-enabled surface while the foldable computer was closed.

In another aspect, a method includes determining that, while a foldable computer is folded closed, a portion of the foldable computer has contacted a touch-enabled surface of the foldable computer. The touch-enabled surface is different from the portion. Responsive to the determination, the method includes executing at least one action at the foldable computer that is related to the portion contacting the touch-enabled surface while the foldable computer is folded closed.

In certain example implementations, the touch-enabled surface may include a touch-enabled display established by a capacitive touch-enabled display and/or a resistive touch-enabled display. The portion may include a key of a keyboard. The at least one action may include storing data in a log, presenting an audible warning at the foldable computer, and/or presenting a visual warning at the foldable computer.

In still another aspect, an apparatus includes at least one computer readable storage medium (CRSM) that is not a transitory signal. The at least one CRSM includes instructions executable by at least one processor to determine that, while a foldable computer is closed, a touch-enabled surface of the foldable computer receives touch input. The instructions are also executable to, responsive to the determination, execute at least one action at the foldable computer that is related to the touch-enabled surface receiving touch input while the foldable computer is closed.

In certain example embodiments, the apparatus may include the foldable computer and the foldable computer may be a smart phone.

The details of present principles, both as to their structure and operation, can best be understood in reference to the accompanying drawings, in which like reference numerals refer to like parts, and in which:

DETAILED DESCRIPTION

Among other things, the detailed description below discusses laptop crush detection using touch LCD odometer counts and zones. For example, resistive touch displays may be used to detect excessive pressures on the display (when a laptop lid is closed) by contact of the display with the keys of the keyboard, the device's trackpoint mouse cursor joystick, and/or device bezels. Capacitive touch displays may also be used to similarly detect touched surfaces if certain contact points are configured with a slight electric charge to interact with the capacitive touch display as a fingertip or other capacitive element otherwise would as well. For example, the enabling charge may be provided by a capacitor that is refreshed/recharged by the computer during normal system use.

The computer's BIOS may then log the sensed touches for diagnostic use later (e.g., by the manufacturer when the device is returned to the manufacturer). The computer may also notify the user immediately or later of the contact between the components (e.g., based on predetermined threshold values).

In some specific cases, these principles may be used to reduce the display/C-cover clearances relative to other portions of the computer during manufacturing based on use data for systems with a given configuration, weight, and use case.

As a specific example, capacitors with an electric charge may be located on a few keys or all keys of the keyboard to enable touch monitoring for capacitive touch screens. The electric charge may be a relatively small amount to conserve battery power. The computer may then leave the touch screen energized while the computer is closed, possibly for the entire time the computer is closed or for only a threshold time after closing. Thus, a key of a keyboard or another portion of the computer pressing up against a touch-enabled display may register the same way a user's finger would with the display.

Additionally, note that in some examples any detected touch recorded from the screen may be considered out of the ordinary, while in other examples a specific minimum amount or range of touch may be considered as such. This may vary by manufacturer design. E.g., a touch of any amount may initiate a warning to the user, or pressure detection may be used to only trigger a warning or other action when a threshold amount of pressure is sensed at the display screen. The threshold amount of pressure may be identified by, for example, the manufacturer running actual pressure tests on the computer or using a computer-aided design (CAD) simulation to determine how much force it takes to begin damaging the display (and/or how many contact points on the display screen are needed to do so). Thus, pressure at a single point may be used or the size of the contact area may be used to infer an amount of pressure in certain examples. For example, the harder two opposing portions of the computer are pressed together while the computer is closed, the wider the contact area between the keyboard and display might become, so the computer can use a threshold contact area (or mere presence/absence of touch) as digital yes/no to infer pressure. Actual pressure sensors within the touch screen (or other computer portion such as a keyboard key pressure sensor) may also be used for identifying specific amounts of pressure at the touch-enabled surface while the computer is closed.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
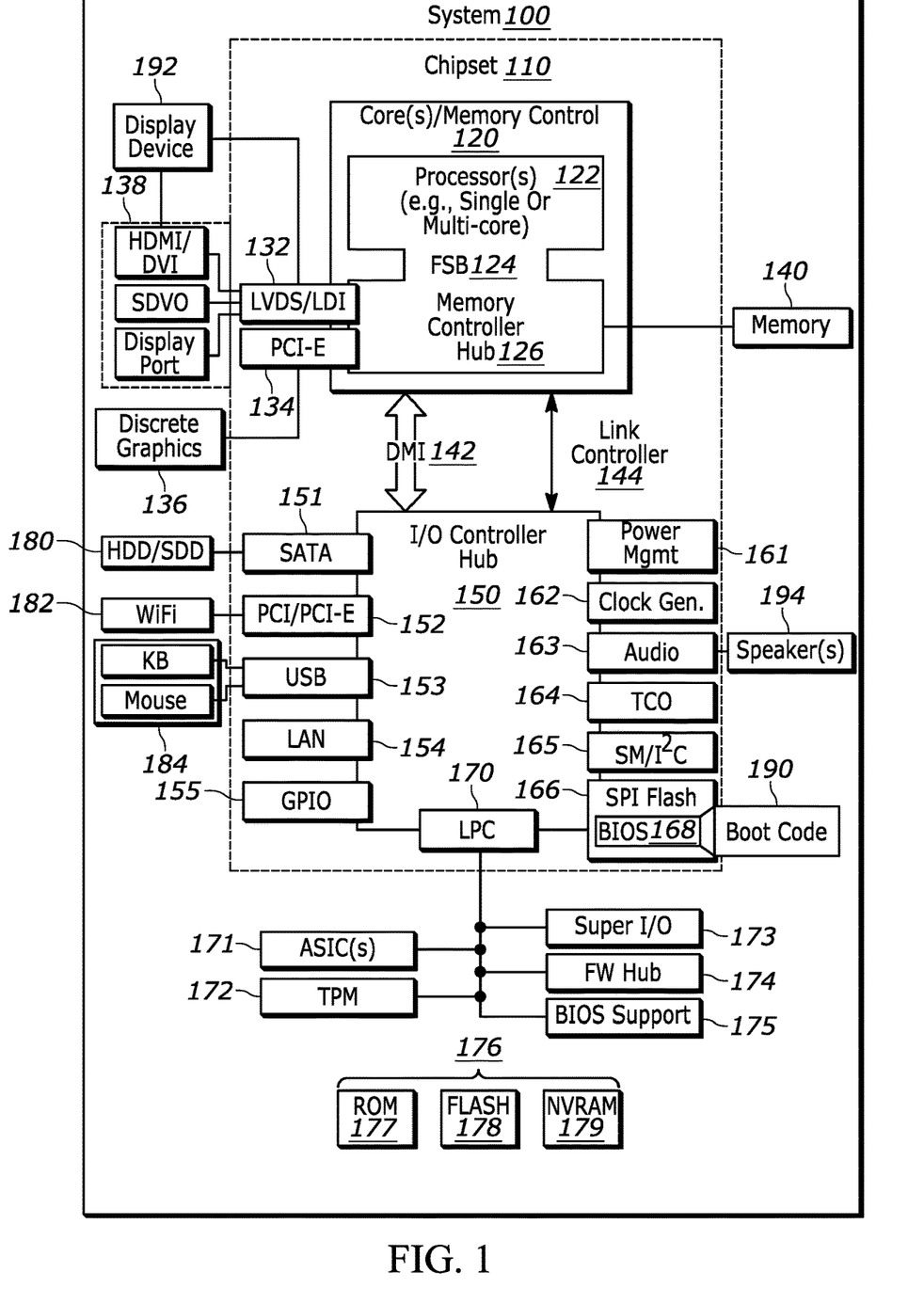
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, note that in some example implementations BIOS may be a set of routines stored in read-only memory that enable a computer to start an operating system and to communicate with the various devices in a system, such as disk drives, keyboards, displays/monitors, printers, and communications ports. In one example embodiment, functions performed by BIOS may also be performed by other higher level software application programs. In another example embodiment, BIOS may be a Unified Extensible Firmware Interface (UEFI), which assists in control handoff of a computer system to an operating system during a pre-boot environment (e.g., after the computer system is powered on, but before the operating system starts).

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122.

Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
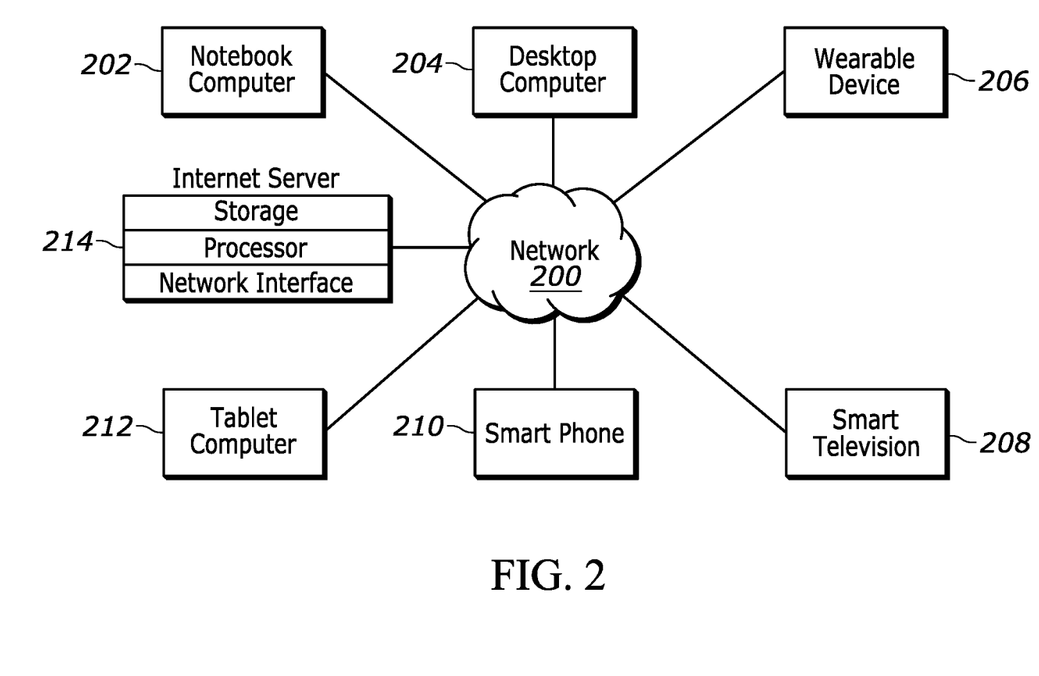
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3A:
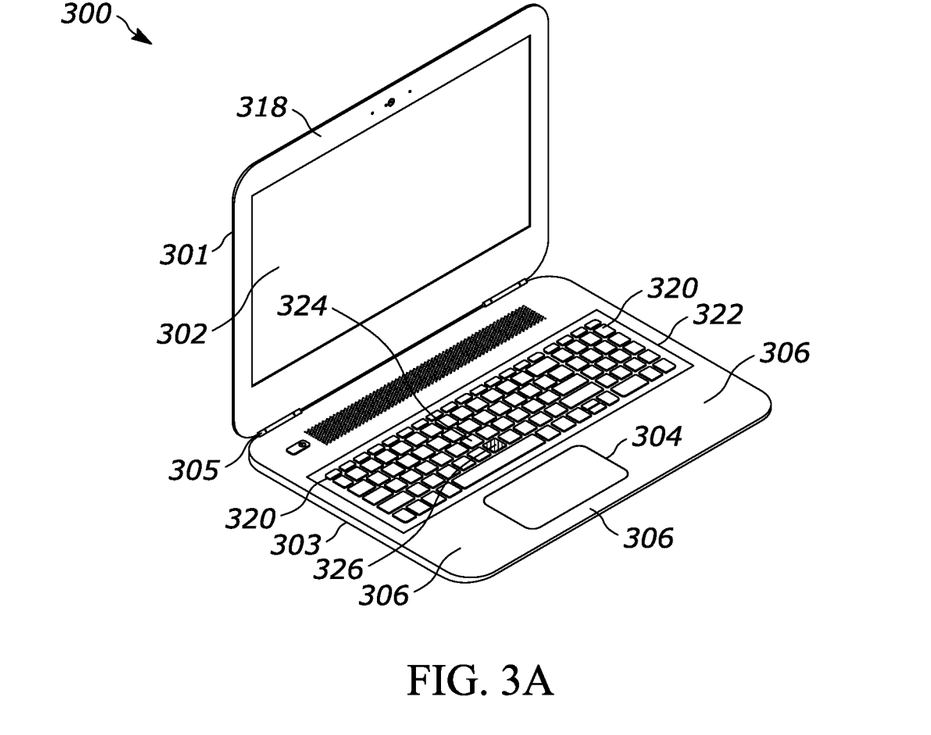
FIG. 3A shows a perspective view of an example laptop computer while open consistent with present principles.
Figure 3B:
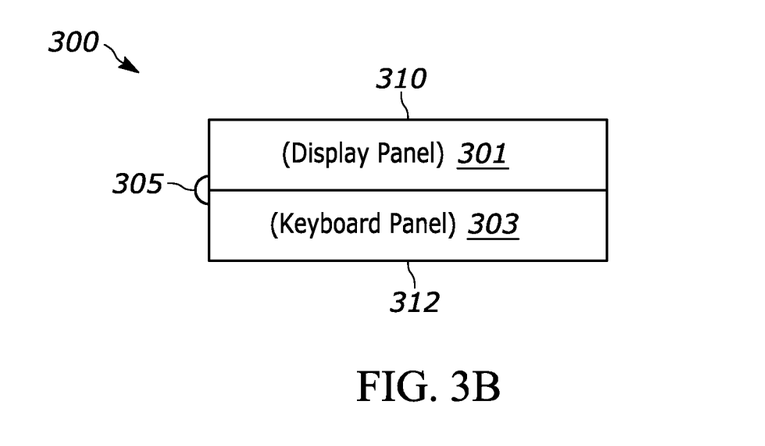
FIG. 3B shows a side elevational view of the laptop computer while the laptop computer is closed consistent with present principles.

Now in reference to FIGS. 3A and 3B, an example foldable computer 300 is shown. In this example, the foldable computer 300 is established by a laptop computer. As such, the computer 300 may have a first/top panel 301 and second/bottom panel 303 that can fold with respect to each other about a hinge 305. The panels 301, 303 may therefore fold between an open configuration as shown in the perspective view of FIG. 3A and a closed configuration as shown in the side elevational view of FIG. 3B.

As also shown in FIG. 3A, the computer 300 may have a first touch-enabled surface in the form of a touch-enabled display 302 as located on the panel 301. The display 302 may be a capacitive touch-enabled display or resistive touch-enabled display, for example. The computer 300 may also have a second touch-enabled surface in the form of a conductive or resistive track/touch pad 304 as located on the panel 303. The touch pad 304 may not necessarily present visual electronic content like a display but may still be touch-enabled to receive an end-user's touch input to move a display cursor (e.g., mouse pointer) and also provide right-click and left-click input.

Both the display 302 and pad 304 may be used for sensing contact with another portion of the computer 300 consistent with present principles. For example, the display 302 and pad 304 may each be used for sensing contact with another portion of the computer 300 on an opposite respective panel 301, 303 as the respective display 302/pad 304 itself when the computer 300 is closed and external pressure is exerted on one or more portions of the computer's housing (e.g., to press at least part of the panel 301 inward toward the panel 303 and/or press at least part of the panel 303 inward toward the panel 301). For example, external pressure might be exerted inward from the external bottom 312 of the computer 300 or external top 310 of the computer 300 in directions that are orthogonal or oblique relative to the primary plane of the respective panel 301, 303.

Thus, as a specific example, one of the display 302 and pad 304 may sense contact with the other of the display 302 and pad 304 when external pressure is applied consistent with present principles. As another example, the display 302 may sense contact with one of various palm rest areas 306 on the housing of bottom panel 303 when external pressure is applied. The pad 304 on the bottom panel 303 may even sense contact with a portion of the bezel 318 of the display 302 on the top panel 301. The display 302 may also sense contact with a trackpoint nub (not shown) that may be located between keys 320 of the computer's keyboard 322 and used like a mini-joystick to move a mouse cursor.

As yet another example, the display 302 may sense contact with one or more of the keys 320 of the keyboard 322 itself. If a resistive touch-enabled display is used, the key (or other portion) may be sensed based on a detected change in resistance at a certain display location contacted by the key (e.g., regardless of material type so long as the key is at least partially conductive). If a capacitive touch-enabled display is used, one or more keys 320 may be configured with a capacitive element on top that can be sensed based on a detected change in capacitance at a certain display location contacted by the capacitive element. For example, one or more capacitors 324 may be placed on the top of various keys 320 of the keyboard 322, and/or one or more keys 320 of the keyboard 322 may be configured with a capacitive film or coating 326 at least on their top surfaces. If a capacitor is used, the capacitor may be charged each time the foldable computer is opened and/or powered on again. Also note that capacitive elements like those described above may also be placed at other locations to sense contact of those other locations with the capacitive display as well (such on the palm rest areas 306 and bezel 318).

Figure 4A:
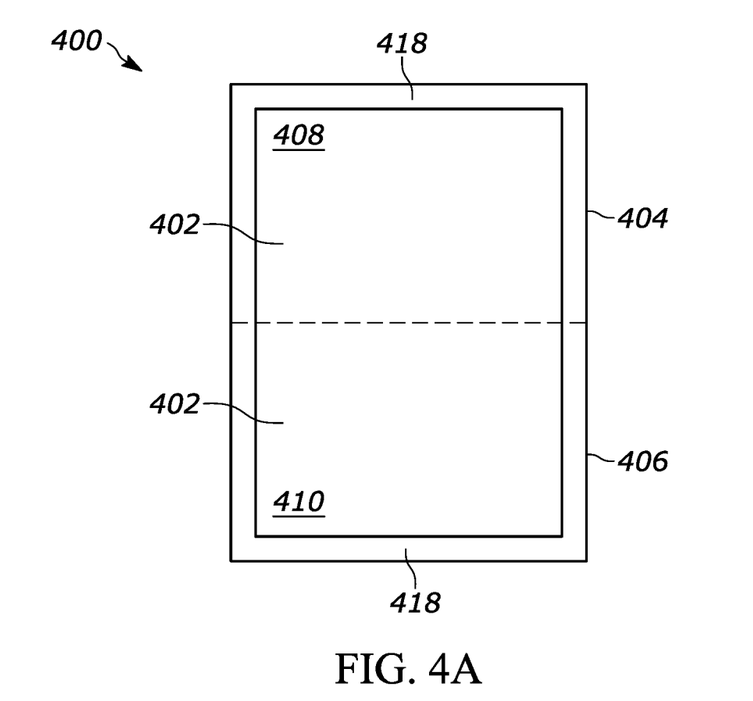
FIG. 4A shows a front elevational view of an example foldable smartphone while open consistent with present principles.
Figure 4B:
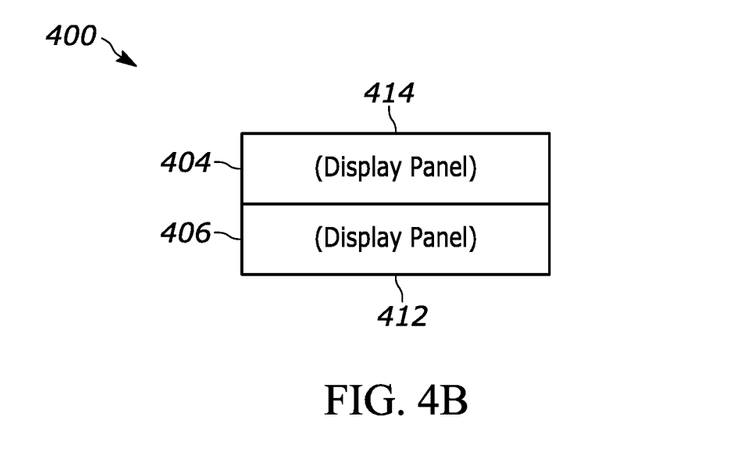
FIG. 4B shows a front elevational view of the smartphone while the smartphone is closed consistent with present principles.

Now in reference to FIGS. 4A and 4B, another example foldable computer 400 is shown. In this case, the foldable computer is established by a foldable smartphone with a foldable touch-enabled display 402 that spans both the first/top panel 404 of the computer 400 and second/bottom panel 406 of the computer 400. The panels 404, 406 may thus fold with respect to each other along a transverse axis 408 between open as shown in the front elevational view of FIG. 4A and closed as shown in the front elevational view of FIG. 4B. Also note that here too the touch-enabled display 402 may be a capacitive or resistive touch-enabled display.

Accordingly, the upper portion 408 of the display 402 (as located on the top panel 404) and the lower portion 410 of the display 402 (as located on the bottom panel 406) may be used for sensing contact with other portions of the computer 400 as described herein. For example, one of the portions 408, 410 may sense contact with part of the other one of the portions 408, 410 when the computer 400 is closed as shown in FIG. 4B and external pressure is applied inward via the computer's housing (e.g., to press at least part of the panel 404 inward toward the panel 406 and/or press at least part of the panel 406 inward toward the panel 404). The pressure might be exerted inward from the external bottom 412 of the computer 400 or external top 414 of the computer 400 in directions that are orthogonal or oblique relative to the primary plane of the respective panel 404, 406. As another example, under similar pressure a portion of the display bezel 418 may contact part of the display 402 on an opposite panel as sensed by that part of the display 402. Note that if a capacitive touch-enabled display is used, one or more portions of the bezel 418 may even be configured with a capacitive element like a capacitor or capacitive coating for sensing by the capacitive display as described herein.

Figure 5:
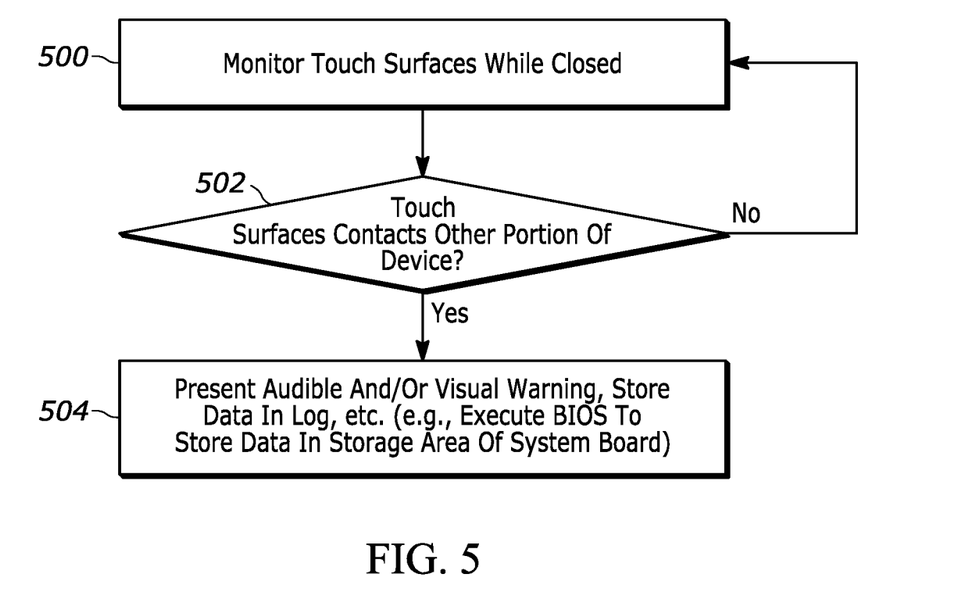
FIG. 5 illustrates example logic in example flow chart format that may be executed by a foldable device consistent with present principles.

Continuing the detailed description in reference to FIG. 5, it shows example logic that may be executed by a device such as the system 100, foldable computer 300, foldable computer 400, and/or another type of foldable client device consistent with present principles. Note that while the logic of FIG. 5 is shown in flow chart format, other suitable logic may also be used. Also note that in some specific examples, the logic of FIG. 5 may be initiated responsive to the foldable device being closed as may be determined from sensors on the device itself such as hinge movement sensors (e.g., potentiometers), inertial sensors such as gyroscopes and accelerometers, and/or other sensors/techniques for determining that the foldable computer has been folded closed.

Beginning at block 500, the device may monitor its touch-enabled surfaces while the device is closed. For example, the device may remain powered on while the device is closed (e.g., even if in a low power mode) for a processor in the device to continue to receive inputs from the touch-enabled surface. The processor may be the device's CPU or a dedicated microprocessor or another type of processor. The device may monitor for touch inputs on the understanding that, while closed, other portions of the device may be configured/manufactured to not contact the touch-enabled surfaces, thus providing clearance space between the touch-enabled surface and the other device portions while the device is closed so that the other portions do not touch or press against the touch-enabled surface and physically damage it (e.g., even if the clearance is only a few micrometers).

Accordingly, from block 500 the logic may proceed to decision diamond 502. At diamond 502 the device may determine, while the foldable computer is closed, whether one or more of the monitored touch-enabled surfaces have been touched/contacted. For example, the absence of touch signals may indicate that the touch-enabled surface has not been contacted and hence lead to a negative determination at diamond 502, while the presence of touch signals may indicate that the touch-enabled surface has been contacted and hence lead to an affirmative determination at diamond 502. Thus, using an example from above, the capacitor 324 or coating 326 as contacting the device's capacitive touch-enabled display may generate a touch signal resulting in an affirmative determination at diamond 502, while a keyboard key itself contacting a resistive touch-enabled display may also generate a touch signal resulting in an affirmative determination at diamond 502 (e.g., with the key in this embodiment also possibly having a resistive coating/external surface for resistive sensing).

Providing other examples for step 502, touch signals less than a threshold magnitude and/or for less than a threshold duration (e.g., one millisecond) may lead to a negative determination at diamond 502, whereas touch signals more than the threshold magnitude and/or for more than the threshold duration may lead to an affirmative determination at diamond 502. To further increase device accuracy, in some specific examples a touch signal may be required to be both more than the threshold magnitude and continuous for more than the threshold duration.

Also to increase device accuracy, in some specific examples the type/amount of change in sensed resistance or capacitance may be used as a factor in the determination at diamond 502 (for resistive and capacitive displays, respectively). For example, the device may access a locally-stored relational database indicating various resistance/capacitance change types/amounts for various types of materials. This database may have been configured by a system administrator or device manufacturer. The device may then use the database to lookup a material for the type/amount of capacitance or resistance change that is sensed to affirmatively determine that the touch-enabled surface has contacted another portion of the device as formed with a known material type. This may help distinguish between actual contact with another portion of the device and a piece of dust or other matter simply falling onto the touch-enabled surface while the device is closed, for example.

An affirmative determination may cause the logic to proceed to block 504, while a negative determination at diamond 502 may cause the logic to proceed back to block 500. At block 504 and responsive to an affirmative determination at diamond 502, the device may execute at least one action at the foldable computer.

For example, the at least one action may include storing data in a log. The data may indicate that, while the foldable computer was closed, a portion of the foldable computer contacted the touch-enabled surface. The data may also indicate a time of day of the contact, a duration of the contact, a total surface area of the contact, and/or a pressure amount for the contact. In some specific examples, this action may be executed by the computer's basic input/output system (BIOS), and the log may be stored in BIOS itself and/or a secure storage area that is accessible to BIOS such as a storage area on a system board included on the device (e.g., the device's motherboard). Thus, in one specific example implementation the storage area at which the log is stored may be established by nonvolatile random-access memory (NVRAM) on the system board (e.g., the device's odometer) since storing the data there may not consume as much power as storing the data on a hard disk drive or solid state drive or other drive located elsewhere within the computer. The log may then be inspected at a later time by a system administrator or manufacturer when, e.g., the device is returned to the administrator or manufacturer with a broken touch-enabled display or other touch-enabled surface.

In addition to or in lieu of storing the data in the log, the at least one action executed at block 504 may include presenting an audible warning and/or a visual warning at the foldable computer. In some specific examples, the warning(s) may be presented responsive to the computer being opened, responsive to the computer being powered on again after opening, responsive to the user unlocking the computer after opening, and/or responsive to the user logging in to the computer after opening. However, warnings as described herein may also be presented while the foldable computer is still closed responsive to the device sensing the contact itself to notify the user of potential display/surface damage so that such damage may be prevented or mitigated by the user.

The audible warning may be presented using one or more speakers on or accessible to the foldable computer (e.g., built-in speakers on the foldable computer or speakers of a wirelessly-connected headset device where the other device is determined to be currently in use by the user so the audible warning may be immediately appreciated regardless of where the foldable computer is located relative to the user). The audible warning may include one or more beeps or other tones, and/or may include a computerized voice indicating that another portion of the computer contacted the touch-enabled surface while the foldable computer was closed. For example, the audible warning may include two beeps of equal length separated by a period of silence, and then a computerized voice may also be presented that indicates "Too much external pressure was applied to your laptop while it was closed, pressing the keyboard into the display. This can cause permanent damage to the display."

Figure 6:
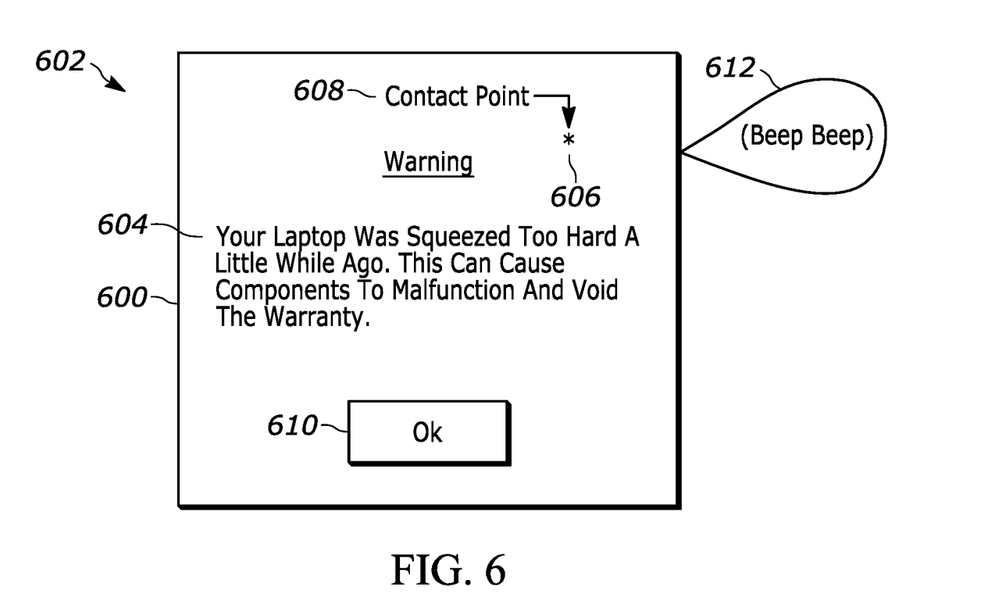
FIG. 6 shows an example visual warning that may be presented to a user consistent with present principles.

The visual warning may be presented as a graphical user interface (GUI) on the display of the foldable computer itself or even the display of another device accessible to the foldable computer (e.g., a connected smartphone or augmented reality headset/smart glasses paired with the foldable computer using Bluetooth communication, where the other device is determined to be currently in use by the user so the visual warning may be immediately viewed even if the foldable computer is closed). The visual warning may include a prompt indicating that another portion of the computer contacted the touch-enabled surface while the computer was closed. An example of such a visual warning is shown in FIG. 6 via the GUI 600.

Accordingly, the GUI 600 as presented on a display 602 may include a warning prompt 604 that the foldable computer (a laptop in this example) was squeezed too hard while it was closed recently and that such squeezing can cause components of the display (or other portions of the device) to become damaged and malfunction, while also possibly voiding the device's warranty. In some examples, the GUI 600 may even indicate a physical display location at which the recent contact was sensed. In this case, the location is indicated by a star or asterisk 606, and text and an arrow 608 may also be presented to draw the user's attention to the location indicated by the star/asterisk 606.

Then once the user has viewed the prompt 604, the user may select the "ok" selector 610 to dismiss the GUI 600 or otherwise remove the visual warning from presentation at the computer. Also note for completeness that the illustrative speech bubble 612 demonstrates that an audible warning in the form of two beeps may also be presented at the same time as the visual warning 600.

Figure 7:
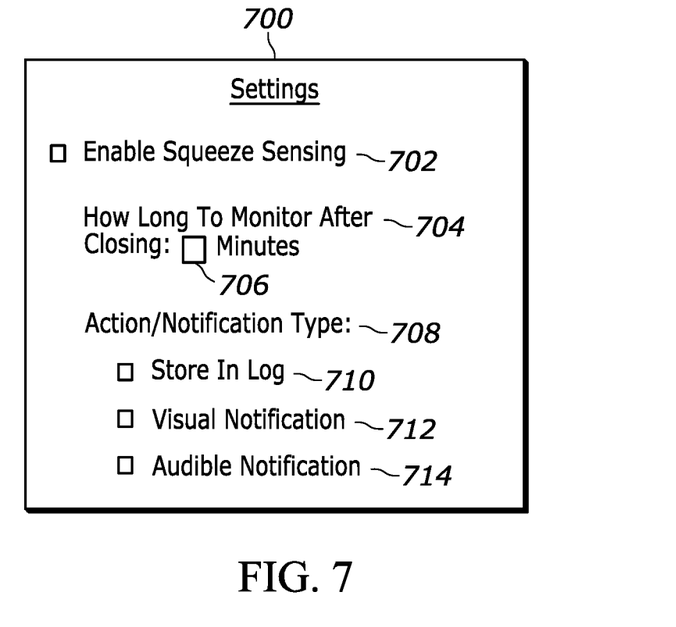
FIG. 7 shows an example settings GUI that may be presented on a display to configure one or more settings of a foldable device to operate consistent with present principles.

FIG. 7 shows an example GUI 700 consistent with present principles that may be presented on the display of a foldable computer to configure/enable one or more settings of the foldable computer for operation as described herein. The settings GUI 700 may be reached by navigating a settings menu of the device or a dedicated app menu for contact monitoring, for example. Also note that in the example shown, each option discussed below may be selected by directing touch or cursor or other input to the respective check box adjacent to the respective option.

As shown in FIG. 7, the GUI 700 may include an option 702 that may be selectable a single time to set or configure the device/system to undertake present principles to monitor for contact of various portions of the device with one or more of the device's touch-enabled surfaces while the device is closed. For example, selection of the option 702 may configure the device to execute the logic of FIG. 5 as well as to execute the other actions described above in reference to FIGS. 3, 4, and 6 in multiple future instances over time.

The GUI 700 may also include a setting 704 at which a length of time after the device has initially been closed may be established for the device to monitor for touch inputs at its touch-enabled surfaces. The length of time may therefore be established be directing numerical input to input box 706 using a hard or soft keyboard to thus save on battery power while the device is closed by limiting the amount of monitoring time (e.g., rather than monitoring for the entire length of time the device is closed without being powered up again).

Still further, if desired the GUI 700 may include a setting 708 at which various specific types of actions may be selected that may be executed at block 504 as described above. Thus, an option 710 may be presented to select storing contact data in a log, option 712 may be selected to select presenting a visual notification/warning, and option 714 may be presented to select presenting an audible notification/warning.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A foldable computer, comprising:
   at least one processor;
   a touch-enabled surface accessible to the at least one processor; and
   storage accessible to the at least one processor and comprising instructions executable by the at least one processor to:
   determine that, while the foldable computer is closed, a portion of the foldable computer has physically contacted the touch-enabled surface, the portion being different from the touch-enabled surface, the touch-enabled surface not being touchable by a user while the foldable computer is closed;
   responsive to the determination, execute at least one action at the foldable computer;
   wherein the at least one action comprises storing data in a log, the data indicating that, while the foldable computer was closed, the portion of the foldable computer contacted the touch-enabled surface.

2. The foldable computer of claim 1, wherein the touch-enabled surface comprises a touch-enabled display, the touch-enabled display established by one or more of: a capacitive touch-enabled display, a resistive touch-enabled display.

3. The foldable computer of claim 2, wherein the touch-enabled display is established by a capacitive touch-enabled display, and wherein the portion is configured with a capacitive element that can be sensed by the capacitive touch-enabled display.

4. The foldable computer of claim 3, wherein the capacitive element comprises a capacitor.

5. The foldable computer of claim 3, wherein the capacitive element comprises a capacitive coating.

6. The foldable computer of claim 1, wherein the portion comprises a touch pad at which input is receivable to move a display cursor.

7. The foldable computer of claim 1, wherein the portion comprises a key of a keyboard.

8. The foldable computer of claim 1, wherein the storing of the data is executed by the foldable computer's basic input/output system (BIOS).

9. The foldable computer of claim 8, comprising a system board, wherein the log is stored in a storage area on the system board, the storage area accessible to the BIOS.

10. A method, comprising:
    determining that, while a foldable computer is folded closed, a portion of the foldable computer has physically contacted a touch-enabled surface of the foldable computer, the touch-enabled surface being different from the portion, the touch-enabled surface not being touchable by a user while the foldable computer is closed; and
    responsive to the determination, executing at least one action at the foldable computer that is related to the portion contacting the touch-enabled surface while the foldable computer is folded closed;
    wherein the at least one action comprises storing data in a log, the data indicating that, while the foldable computer was folded closed, the portion of the foldable computer physically contacted the touch-enabled surface.

11. The method of claim 10, comprising: using the foldable computer's basic input/output system (BIOS) to store the data in nonvolatile random-access memory (NVRAM) on the foldable computer's motherboard.

12. The method of claim 10, wherein the portion comprises a key of a keyboard.

13. An apparatus, comprising:
    at least one computer readable storage medium (CRSM) that is not a transitory signal, the at least one computer readable storage medium comprising instructions executable by at least one processor to:
    determine that, while a foldable computer is closed, a touch-enabled display of the foldable computer receives touch input, the touch-enabled display not being touchable by a user while the foldable computer is closed; and
    responsive to the determination, execute at least one action at the foldable computer that is related to the touch-enabled display receiving touch input while the foldable computer is closed, the at least one action comprising presenting, on a first display, a graphical user interface (GUI), the GUI comprising a graphical warning indicating the display location at which the touch-enabled display received the touch input while the foldable computer was closed.

14. The apparatus of claim 13, wherein the first display is located on a second device different from the foldable computer, the second device being in wireless communication with the foldable computer.

15. The apparatus of claim 14, wherein the instructions are executable to:
    determine that the second device is currently in use by a user; and
    based on the determination that the second device is currently in use by a user, present the GUI on the first display.

16. The apparatus of claim 13, wherein the at least one action comprises storing data in a log, the data indicating that, while the foldable computer was closed, the touch-enabled surface of the foldable computer received touch input.

17. The apparatus of claim 16, wherein the storing of the data is executed by the foldable computer's basic input/output system (BIOS).

18. The apparatus of claim 17, wherein the log is stored in nonvolatile random-access memory (NVRAM) on a motherboard using the foldable computer's BIOS.

19. The apparatus of claim 13, wherein the first display is the touch-enabled display.

* * * * *

UNITED STATES PATENT AND TRADEMARK OFFICE
CERTIFICATE OF CORRECTION

| | |
|---|---|
| PATENT NO. | : 11,740,665 B1 |
| APPLICATION NO. | : 17/817745 |
| DATED | : August 29, 2023 |
| INVENTOR(S) | : Summerville et al. |

It is certified that error appears in the above-identified patent and that said Letters Patent is hereby corrected as shown below:

On the Title Page

Applicant should be listed as:  Lenovo (Singapore) Pte. Ltd.
151, Lorong Chuan #02-01
New Tech Park
Singapore, Singapore 556741

Signed and Sealed this
Seventeenth Day of October, 2023

Katherine Kelly Vidal
*Director of the United States Patent and Trademark Office*